US012322903B2

(12) United States Patent
Hung et al.

(10) Patent No.: US 12,322,903 B2
(45) Date of Patent: Jun. 3, 2025

(54) CABLE CONNECTOR AND CABLE CONNECTOR ASSEMBLY WITH IMPROVED UNLOCKING MECHANISM

(71) Applicant: DONGGUAN LUXSHARE TECHNOLOGIES CO., LTD, Dongguan (CN)

(72) Inventors: Yung-Chih Hung, Dongguan (CN); Rongzhe Guo, Dongguan (CN)

(73) Assignee: DONGGUAN LUXSHARE TECHNOLOGIES CO., LTD, Dongguan (CN)

( * ) Notice: Subject to any disclaimer, the term of this patent is extended or adjusted under 35 U.S.C. 154(b) by 438 days.

(21) Appl. No.: 17/953,742

(22) Filed: Sep. 27, 2022

(65) Prior Publication Data

US 2023/0198204 A1 Jun. 22, 2023

(30) Foreign Application Priority Data

Dec. 20, 2021 (CN) ......................... 202123234722.8

(51) Int. Cl.

| | |
|---|---|
| ***H01R 4/28*** | (2006.01) |
| ***H01R 13/516*** | (2006.01) |
| ***H01R 13/633*** | (2006.01) |
| ***H01R 13/639*** | (2006.01) |

(52) U.S. Cl.

CPC ........... *H01R 13/6335* (2013.01); *H01R 4/28* (2013.01); *H01R 13/516* (2013.01); *H01R 13/639* (2013.01)

(58) Field of Classification Search

CPC .... H01R 13/6335; H01R 4/28; H01R 13/516; H01R 13/639; H01R 13/506; H01R 12/774; H01R 13/6272; H01R 13/187

See application file for complete search history.

(56) References Cited

U.S. PATENT DOCUMENTS 4,892,491 A * 1/1990 Budano, II ............. H01R 24/44 439/840
5,322,453 A * 6/1994 Resnick ................. H01R 24/50 439/63
5,667,413 A * 9/1997 Trafton ................ H01R 13/187 439/271
5,772,470 A * 6/1998 Togashi ............... H01R 9/0518 439/582

(Continued)

*Primary Examiner* — Truc T Nguyen

(74) *Attorney, Agent, or Firm* — Birch, Stewart, Kolasch & Birch, LLP

(57) ABSTRACT

A cable connector includes an insulating housing with a receiving cavity, a metal connecting member with an inner cavity, a conductive terminal, a cable, and an unlocking mechanism. The conductive terminal is installed in the inner cavity of the metal connecting member. The metal connecting member is received in the receiving cavity and connected with the cable. The insulating housing includes a body portion and a locking portion located on one side of the body portion. The unlocking mechanism cooperates with the locking portion and is configured to drive the first end portion to move in a first direction and drive the second end portion to move in a second direction. The present disclosure also provides a cable connector assembly. By providing the unlocking mechanism matched with the insulating housing, it facilitates the unlocking between the cable connector and the mating connector.

20 Claims, 17 Drawing Sheets

(56) References Cited

U.S. PATENT DOCUMENTS

| | | | | |
|---|---|---|---|---|
| 6,837,743 | B2 * | 1/2005 | Ko | H01R 9/0518 439/585 |
| 6,846,195 | B2 * | 1/2005 | Annequin | H01R 13/6272 439/352 |
| 10,862,256 | B2 * | 12/2020 | Sundermeier | H01R 13/6315 |
| 2005/0064734 | A1 * | 3/2005 | Chang | H01R 24/52 439/63 |
| 2014/0038447 | A1 * | 2/2014 | Brown | H01R 13/62 439/350 |
| 2016/0181706 | A1 * | 6/2016 | Nakano | H01R 13/111 439/877 |
| 2017/0214168 | A1 * | 7/2017 | Schroll | H01R 13/641 |
| 2018/0090881 | A1 * | 3/2018 | Tyler | H01R 13/62938 |
| 2018/0166827 | A1 * | 6/2018 | Little | H01R 13/6335 |
| 2020/0410974 | A1 | 12/2020 | Feng et al. | |
| 2021/0249827 | A1 * | 8/2021 | Haga | H01R 24/40 |
| 2021/0408727 | A1 * | 12/2021 | Fan | H01R 13/6275 |

* cited by examiner

CABLE CONNECTOR AND CABLE CONNECTOR ASSEMBLY WITH IMPROVED UNLOCKING MECHANISM

CROSS-REFERENCE TO RELATED APPLICATION

This patent application claims priority of a Chinese Patent Application No. 202123234722.8, filed on Dec. 20, 2021 and titled "CABLE CONNECTOR AND CABLE CONNECTOR ASSEMBLY", the entire content of which is incorporated herein by reference.

TECHNICAL FIELD

The present disclosure relates to a cable connector and a cable connector assembly, which belongs to a technical field of connectors.

BACKGROUND

Limited by the current high-speed development of servers, product miniaturization has become a trend. A board end connector is usually mounted to a circuit board inside a shell of the server. A cable connector is used for mating with the board end connector to realize signal transmission. In order to ensure the stability of signal transmission, a locking mechanism is generally provided to maintain a locking state between the cable connector and the board end connector. The locking mechanism can also be unlocked, so that the locking state between the cable connector and the board end connector is released. However, the product installation in the shell tends to be intensive, which results in a small operating space for the locking mechanism when the cable connector and the board end connector are mated. As a result, it is inconvenient to unlock the cable connector and the board end connector when needed.

Therefore, it is necessary to provide a cable connector and a cable connector assembly to solve the above-mentioned problem.

SUMMARY

An object of the present disclosure is to provide a cable connector and cable connector assembly which have reliable structures and are easy to complete unlocking when needed.

In order to achieve the above object, the present disclosure adopts the following technical solution: a cable connector, including: an insulating housing including a body portion and a locking portion located on one side of the body portion, the locking portion including a pivot portion connected with the body portion and a locking plate connected with the pivot portion, the locking plate extending along a mating direction, the locking plate being provided with a middle section connected with the pivot portion, and a first end and a second end respectively extending in opposite directions from two ends of the middle section, the body portion defining a receiving cavity extending through the body portion along the mating direction, a bottom of the body portion being a mating end, and a top of the body portion being a cable connection end; a metal connecting member received in the receiving cavity, the metal connecting member including an inner cavity recessed inwardly from a bottom wall of the metal connecting member; a conductive terminal installed in the inner cavity of the metal connecting member; a cable connected to the metal connecting member which is located on the top of the body portion; and an unlocking mechanism cooperating with the first end, the unlocking mechanism being configured to drive the first end to move in a first direction adjacent to the body portion, and to drive the second end to move in a second direction away from the body portion.

In order to achieve the above object, the present disclosure adopts the following technical solution: a cable connector assembly, including: the cable connector mentioned above; and a mating connector including an insulating body and a mating terminal, the insulating body including a base portion for holding the mating terminal and a holding portion extending from the base portion in the mating direction; wherein the holding portion is provided with a protrusion protruding outwardly along the second direction, and the protrusion is mated with the second end.

In order to achieve the above object, the present disclosure adopts the following technical solution: a cable connector assembly, including: a cable connector, including: an insulating housing including a body portion and a locking portion located on one side of the body portion, the locking portion including a pivot portion connected with the body portion and a locking plate connected with the pivot portion, the locking plate extending along a mating direction, the locking plate being provided with a middle section connected with the pivot portion, and a first end and a second end respectively extending in opposite directions from two ends of the middle section, the body portion defining a receiving cavity along the mating direction; a metal connecting member received in the receiving cavity, the metal connecting member defining an inner cavity; a conductive terminal fixed in the inner cavity of the metal connecting member; a cable electrically connected to the metal connecting member; and an unlocking mechanism cooperating with the first end, the unlocking mechanism being configured to drive the first end to move in a first direction towards the body portion, and to drive the second end to move in a second direction away from the body portion, simultaneously; and a mating connector including an insulating body and a mating terminal, the insulating body including a base portion for fixing the mating terminal and a holding portion, the holding portion being provided with a protrusion; when the cable connector and the mating connector are mated with each other, the second end of the unlocking mechanism is in lock with the protrusion along the mating direction; and when the cable connector and the mating connector are required to be separated from each other, the second end of the unlocking mechanism is driven by an external force to move in the second direction away from the body portion so as to disengage with the protrusion along the mating direction.

Compared with the prior art, the present disclosure facilitates the unlocking between the cable connector and the mating connector by providing the unlocking mechanism which cooperates with the insulating housing, and reduces the impact caused by the space restriction.

DETAILED DESCRIPTION

Figure 1:
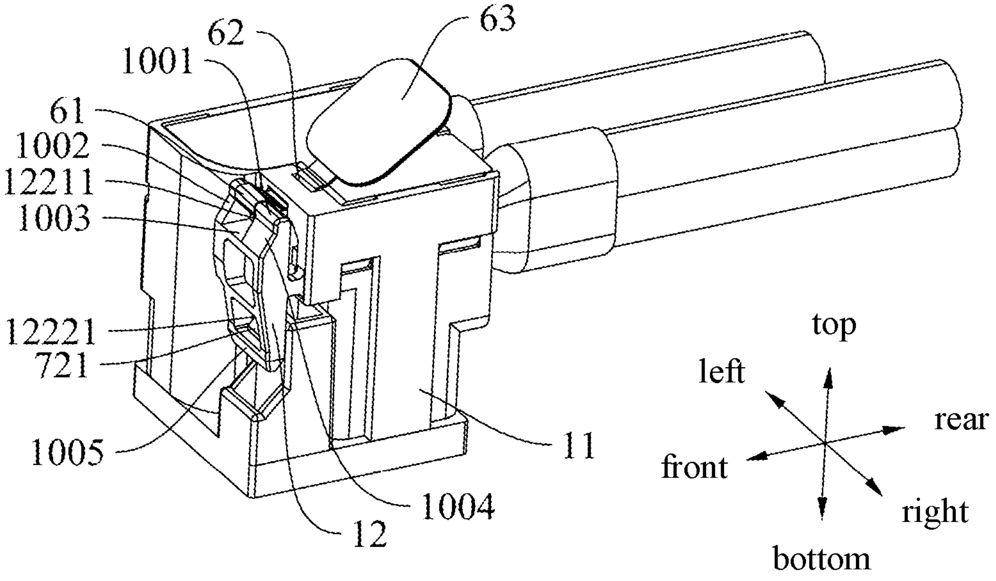
FIG. 1 is a perspective schematic view of a cable connector assembly in accordance with an embodiment of the present disclosure.

Exemplary embodiments will be described in detail here, examples of which are shown in drawings. When referring to the drawings below, unless otherwise indicated, same numerals in different drawings represent the same or similar elements. The examples described in the following exemplary embodiments do not represent all embodiments consistent with this application. Rather, they are merely examples of devices and methods consistent with some aspects of the application as detailed in the appended claims.

The terminology used in this application is only for the purpose of describing particular embodiments, and is not intended to limit this application. The singular forms “a”, “said”, and “the” used in this application and the appended claims are also intended to include plural forms unless the context clearly indicates other meanings.

It should be understood that the terms “first”, “second” and similar words used in the specification and claims of this application do not represent any order, quantity or importance, but are only used to distinguish different components. Similarly, “an” or “a” and other similar words do not mean a quantity limit, but mean that there is at least one; “multiple” or “a plurality of” means two or more than two. Unless otherwise noted, “front”, “rear”, “lower” and/or “upper” and similar words are for ease of description only and are not limited to one location or one spatial orientation. Similar words such as “include” or “comprise” mean that elements or objects appear before “include” or “comprise” cover elements or objects listed after “include” or “comprise” and their equivalents, and do not exclude other elements or objects. The term “a plurality of” mentioned in the present disclosure includes two or more.

Hereinafter, some embodiments of the present disclosure will be described in detail with reference to the accompanying drawings. In the case of no conflict, the following embodiments and features in the embodiments can be combined with each other.

Referring to FIGS. 1 to 30, the present disclosure discloses a cable connector assembly including a cable connector 100 and a mating connector 200 for mating with the cable connector 100. In an illustrated embodiment of the present disclosure, the mating connector 200 is a board-end connector for being mounted to a circuit board (not shown). Referring to FIG. 2, the cable connector 100 is adapted to connect with the mating connector 200 along a top-bottom direction/a mating direction in FIG. 1 to realize data transmission.

Referring to FIGS. 1 to 18, FIGS. 19 to 21, FIGS. 22 to 24, and FIGS. 24 to 30, specific structures of the cable connector assembly in various first embodiment to fourth embodiment of the present disclosure are disclosed. Specific implementations of the cable connector assembly of the present disclosure will be described mainly with reference to the first embodiment as shown in FIGS. 1 to 18, and in conjunction with other drawings when necessary.

Figure 2:
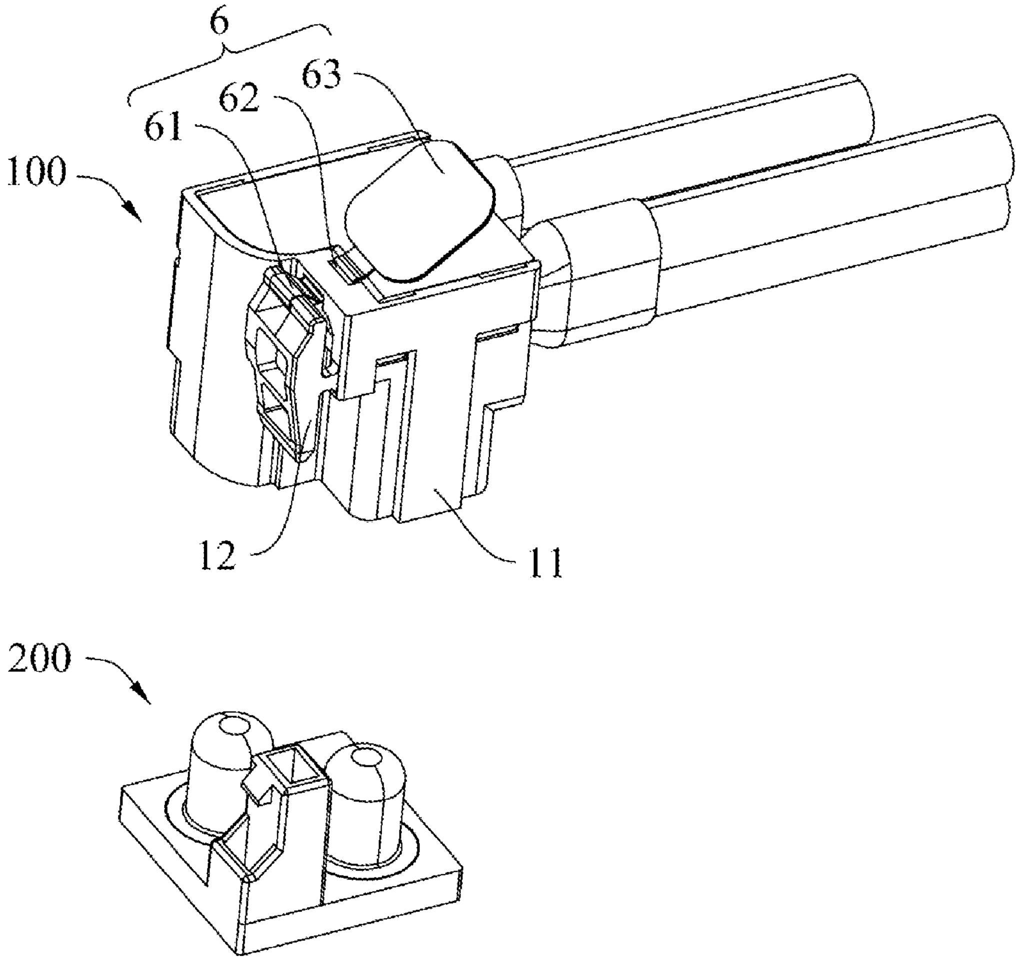
FIG. 2 is a perspective schematic view of a cable connector and a mating connector of the cable connector assembly in accordance with the embodiment of the present disclosure when the cable connector is separated.
Figure 3:
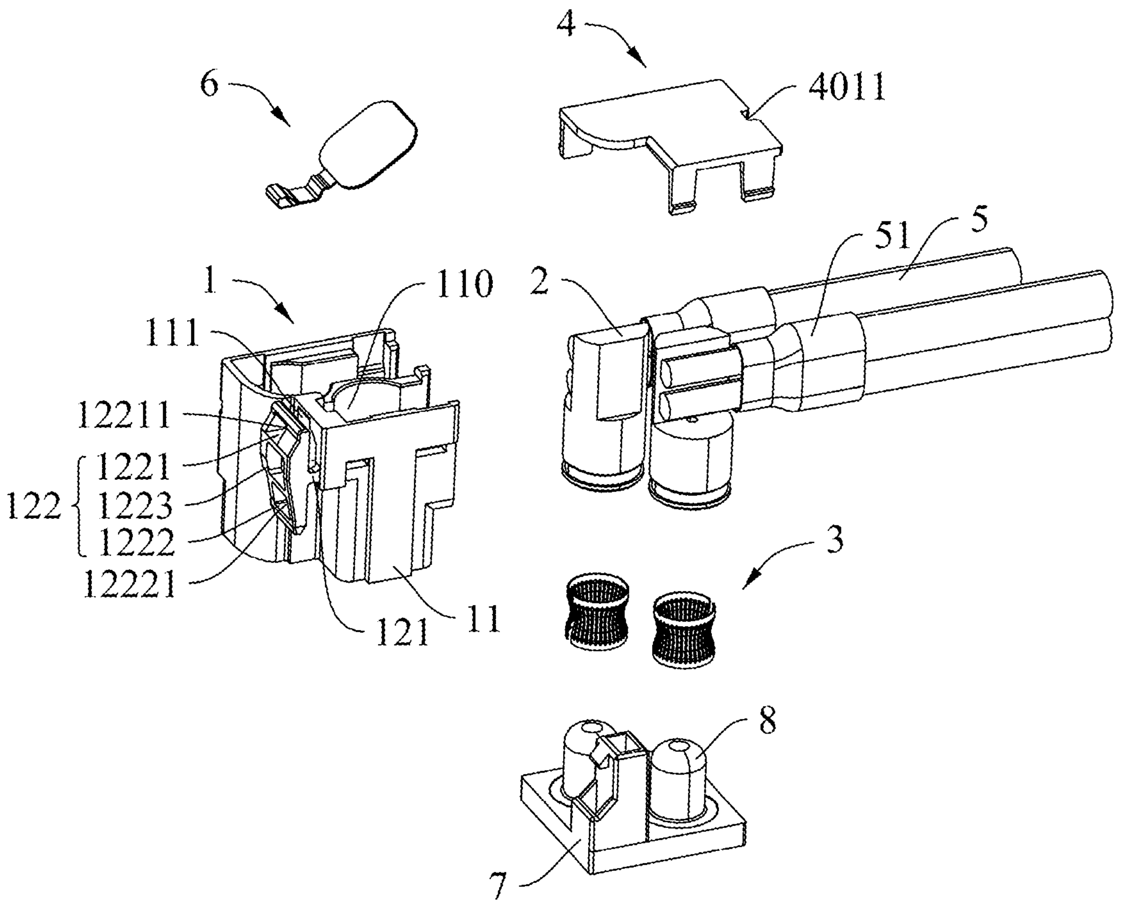
FIG. 3 is a further perspective exploded schematic view of FIG. 2.
Figure 4:
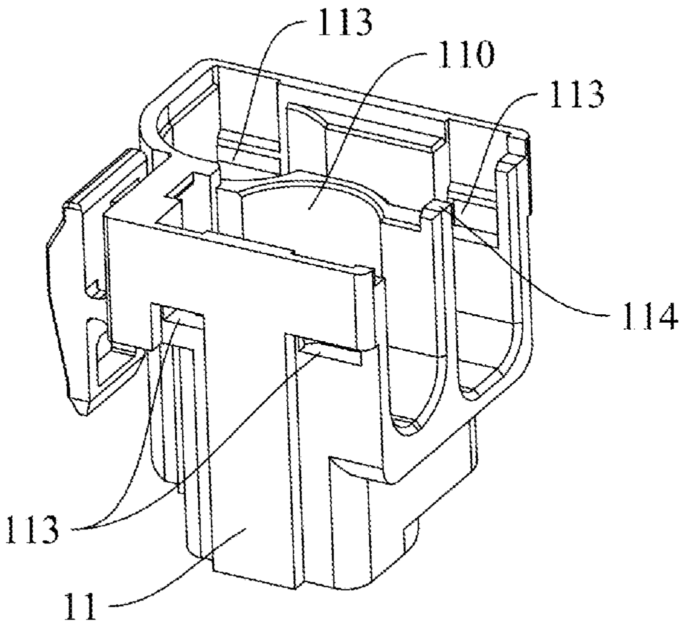
FIG. 4 is a perspective schematic view of an insulating housing of the cable connector in accordance with an embodiment of the present disclosure.

Referring to FIGS. 1 to 3, the cable connector 100 includes an insulating housing 1 with a receiving cavity 110, a metal connecting member 2 with an inner cavity, a plurality of conductive terminals 3, a plurality of cables 5, and an unlocking mechanism. For the convenience of description, it is also marked in FIG. 1 a left-right direction and a front-rear direction which are perpendicular to the mating direction. In this embodiment, the cables 5 are divided into two groups. The cables 5 are arranged side by side in the left-right direction in FIG. 1. The cable 5 in each group extends in the front-rear direction in FIG. 1. In an embodiment of the present disclosure, the front-rear direction also includes a first direction facing the cable 5 from front to rear and a second direction facing away from the cable 5 from rear to front. That is, the first direction and the second direction are opposite to each other.

A bottom wall of the metal connecting member 2 is recessed inwardly to form an inner cavity. The conductive terminal 3 is attached and installed in the inner cavity of the metal connecting member 2. The metal connecting member 2 is received in the receiving cavity 110 and connected to the cable 5. The insulating housing 1 includes a body portion 11 and a locking portion 12 located on a side of the body portion 11. The unlocking mechanism cooperates with the locking portion 12 and is configured to drive the first end portion 1221 of the locking portion 12 to move in the first direction, and is configured to enable the second end 1222 of the locking portion 12 to move in the second direction.

Referring to FIG. 3, the locking portion 12 includes a pivot portion 121 connected to the body portion 11 and a locking plate 122 connected to the pivot portion 121. The locking plate 122 extends along the mating direction. The locking plate 122 is provided with a middle section 1223 connected with the pivot portion 121, a first end 1221 and a second end 1222. The first end 1221 and the second end 1222 extend in opposite directions from two ends of the middle section 1223, respectively. The unlocking mechanism cooperates with the first end portion 1221 to drive the first end portion 1221 to move in a direction (that is, the first direction) close to the body portion 11, and to drive the second end portion 1222 to move in a direction (that is, the second direction) away from the body portion 11.

The body portion 11 defines a receiving cavity 10 which extending up and down along the mating direction. The receiving cavity 10 is generally of a cylindrical configuration, and is used for receiving the metal connecting member 2 generally of a cylindrical configuration. A bottom of the body portion 11 is a mating end, and a top of the body portion 11 is a cable connection end.

Figure 9:
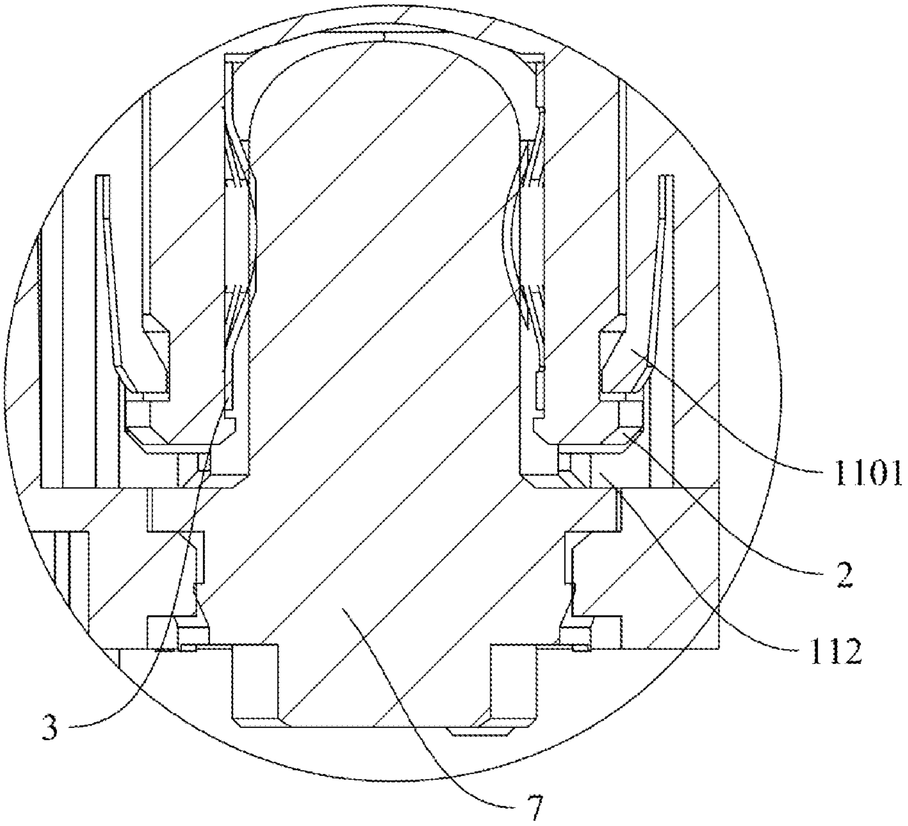
FIG. 9 is a partial enlarged schematic view of a circled part in FIG. 8.
Figure 10:
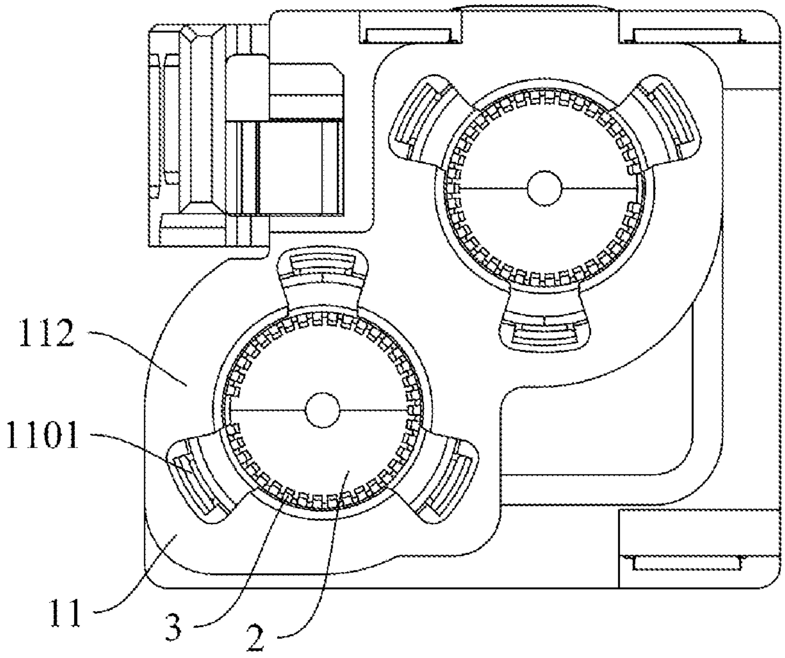
FIG. 10 is a schematic bottom view of FIG. 1 with cables removed.
Figure 11:
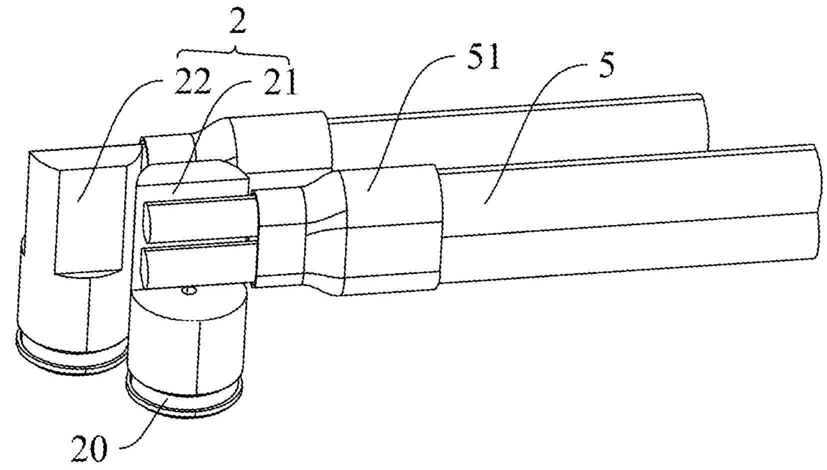
FIG. 11 is a perspective schematic view of a metal connecting member and the cables of the cable connector in accordance with an embodiment of the present disclosure.
Figure 12:
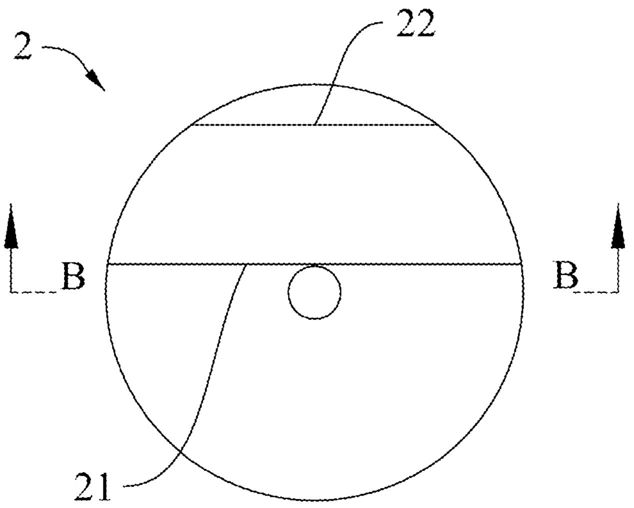
FIG. 12 is a schematic top view of the metal connecting member and the conductive terminal in FIG. 11.

Referring to FIGS. 9 to 11, a concave ring 20 is provided on an outer peripheral wall of the metal connecting member 2. An inner wall of the receiving cavity 10 is provided with a plurality of claws 1101 for cooperating with the concave ring 20. In this embodiment, the number of the claws 1101 is set to three. In other embodiments, the number of the claws 1101 can be set to one or any number greater than one, which is not limited here. With this arrangement, the metal connecting member 2 can be stably confined in the body portion 11 in the mating direction, consumables can be saved, and the process can be simplified.

The body portion 11 has a bottom wall 112. The bottom wall 112 can support the bottom wall of the metal connecting member 2 so that the metal connecting member 2 can be more stably confined in the body portion 11.

Left and right sides of the top wall of the metal connecting member 2 are recessed to form a first plane 21 and a second plane 22, respectively.

Figure 6:
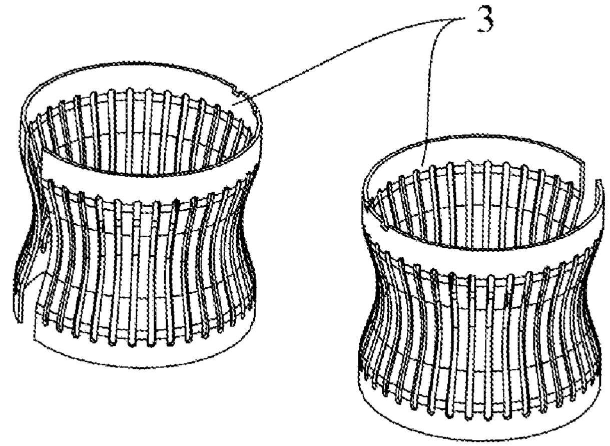
FIG. 6 is a perspective schematic view of conductive terminals of the cable connector in accordance with an embodiment of the present disclosure.
Figure 7:
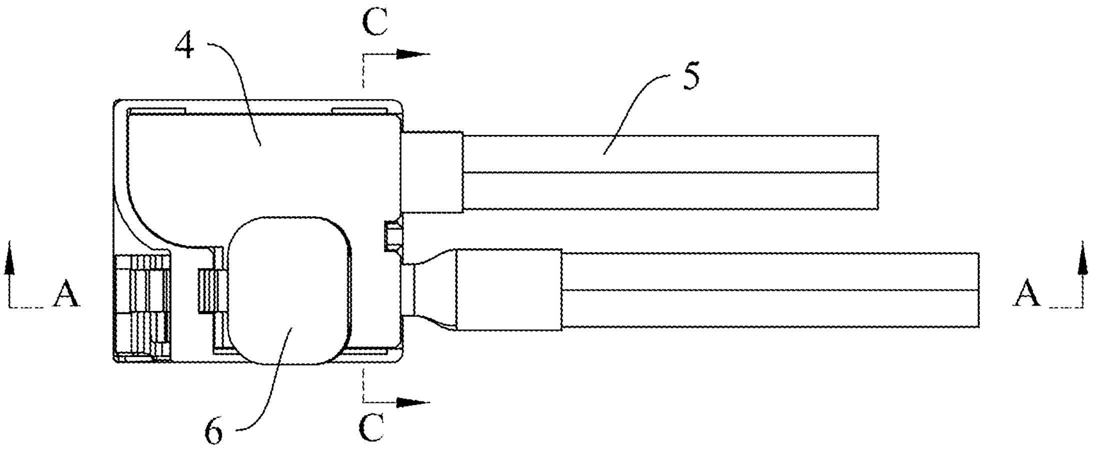
FIG. 7 is a schematic top view of FIG. 1.
Figure 8:
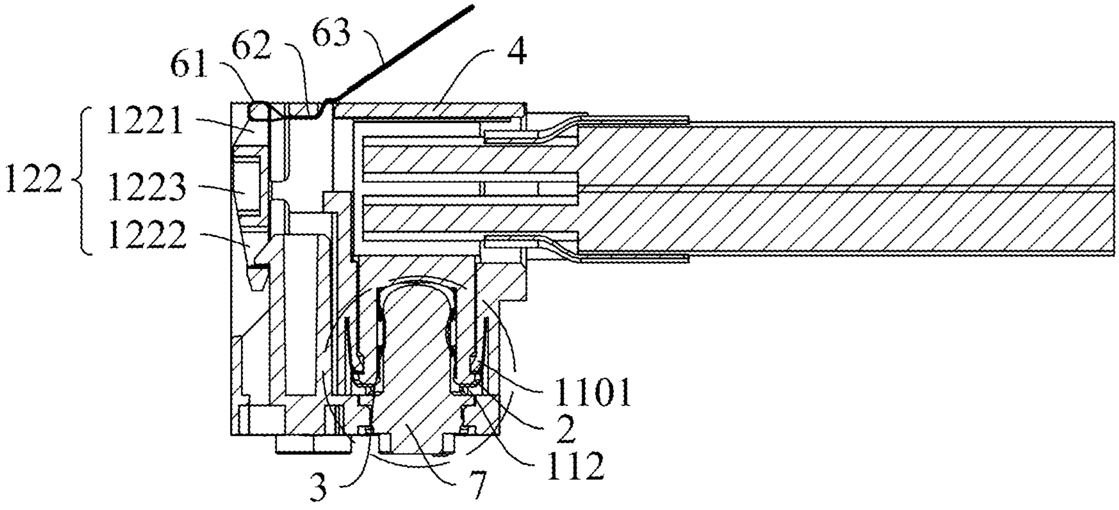
FIG. 8 is a schematic cross-sectional view taken along line A-A of FIG. 7.
Figure 13:
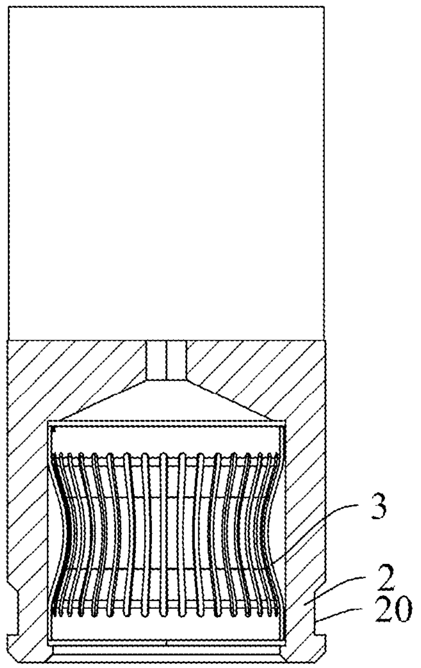
FIG. 13 is a schematic cross-sectional view taken along line B-B of FIG. 12.

Referring to FIGS. 6, 9 and 13, the conductive terminal 3 is a crown spring, and is attached and installed in the inner cavity of the metal connecting member 2. A lower end of the inner cavity wall of the metal connecting member 2 is provided with a convex ring to prevent the conductive terminal 3 from falling out of the inner cavity of the metal connecting member 2.

Referring to FIGS. 3 and 11, an end of the cable 5 is covered with a heat shrinkable sleeve 51. A core 52 of the cable 5 is exposed outside the heat shrinkable sleeve 51 and is ultrasonically welded to the first plane 21 of the metal connecting member 2. The top of the body portion 11 is provided with an accommodation cavity for accommodating a part of the cable 5. The side of the body portion 11 opposite to the locking portion 12 is provided with a through slot for allowing the cable 5 to pass through.

Referring to FIG. 1, the unlocking mechanism is a pull strap 6. The first end portion 1221 defines a first through hole 12211 recessed from an outer side wall of the first end portion 1221 along the first direction. The first through hole 12211 is surrounded by a first side wall 1001, a second side wall 1002, a third side wall 1003, and a fourth side wall 1004. In this embodiment, a wall thickness of the second side wall 1002 in the left-right direction is smaller than a wall thickness of the fourth side wall 1004 in the left-right direction. In other embodiments, the wall thickness of the second side wall 1002 in the left-right direction may be greater than or equal to the wall thickness of the fourth side wall in the left-right direction.

The first through hole 12211 is located between the first side wall 1001 and the middle section 1223 in the mating direction.

The pull strap 6 has a fixing portion 61 passing through the first through hole 12211 and covering an outer periphery of the first side wall 1001. A width of the fixing portion 61 in the left-right direction is equal to a length of the first side wall 1001 corresponding to the first through hole 12211. That is, the position corresponding to the first through hole 12211 on the first side wall 1001 is completely covered by the fixing portion 61. This arrangement prevents the fixing portion 61 from shaking on the first side wall 1001 when the pull strap 6 is pulled, so that the operation is more stable. At the same time, the fixed portion 61 is made to have a larger width, and the pull strap 6 is not easily broken, thereby increasing its service life.

The pull strap 6 further includes a first operating portion 63, and a connecting portion 62 connected between the fixing portion 61 and the first operating portion 63. In this embodiment, the connecting portion 62 is centrally connected to one end of the first operating portion 63 in the left-right direction. With this arrangement, when an operator pulls the pull strap 6, the force acting on the pull strap 6 is more even, which is convenient to unlock and is beneficial to prolong the service life of the pull strap 6.

The top wall of the body portion 11 defines a first slot 111. After the connecting portion 62 passes through the first slot 111, the first operating portion 63 is exposed on the top wall of the body portion 11. An orthographic projection of the pull strap 6 on the top wall of the body portion 11 does not exceed an area of the top wall of the body portion 11 itself, so as to prevent the pull strap 6 from interfering with the cable connector 100.

Figure 5:
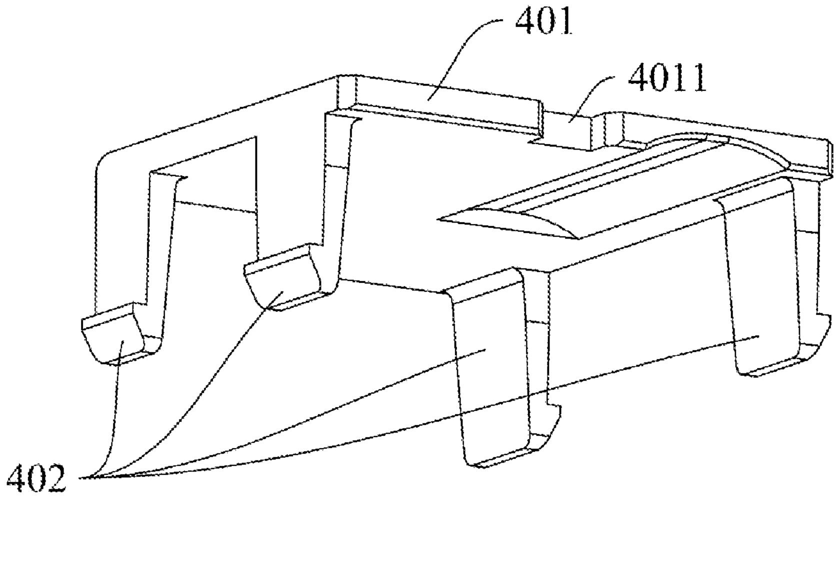
FIG. 5 is a perspective schematic view of an upper cover of the cable connector in accordance with an embodiment of the present disclosure.
Figure 14:
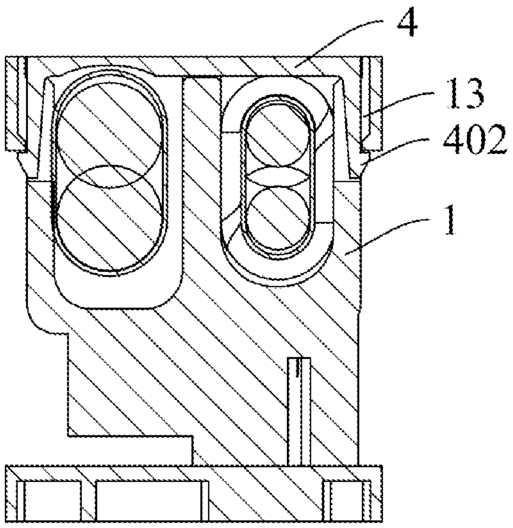
FIG. 14 is a schematic cross-sectional view taken along line C-C in FIG. 7.

Referring to FIGS. 5 and 14, the cable connector 100 further includes an upper cover 4 covering the top of the body portion 11. The upper cover 4 includes a base plate portion 401 and four hook portions 402 extending from the base plate portion 401 along the mating direction. The two side walls of the body portion 11 are respectively provided with slots 113 which cooperate with the hook portions 402. At least a pair of the hook portion 402 and the slot 113 are provided. A notch 4011 is provided on one side of the base plate portion 401. The body portion 11 is provided with a protrusion 114 which abuts against the notch 4011. This allows the upper cover 4 to be more firmly confined on the body portion 11 in the first direction.

Figure 15:
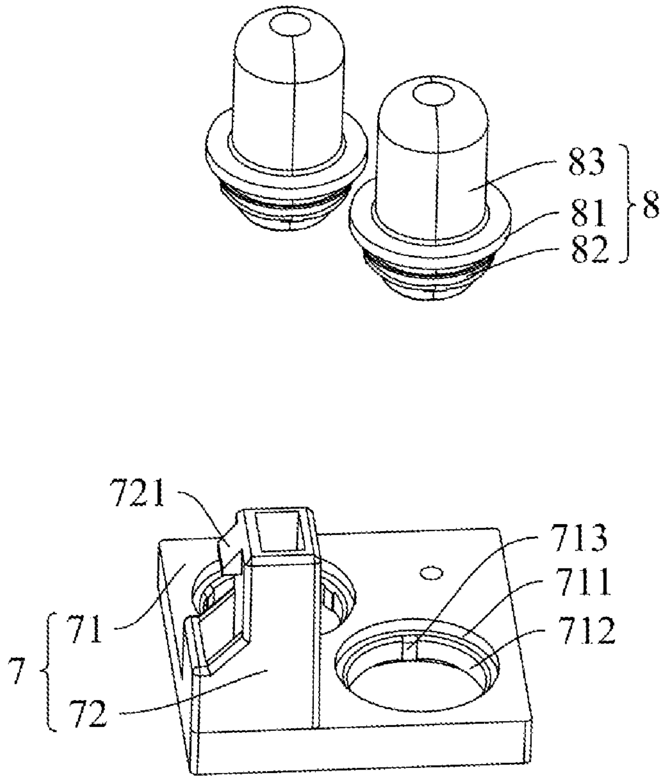
FIG. 15 is a perspective exploded schematic view of a mating connector of the cable connector assembly in accordance with an embodiment of the present disclosure.

Referring to FIG. 15, the mating connector 200 includes an insulating body 7 and a plurality of mating terminals 8. The insulating body 7 includes a base portion 71 for holding the mating terminals 8 and a holding portion 72 extending from the base portion 71 along the mating direction.

The holding portion 72 is provided with a protrusion 721 protruding outwardly along the second direction. The protrusion 721 is mated with the second end 1222. In this embodiment, the second end 1222 is provided with a second through hole 12221 and a fifth sidewall 1005 located below the second through hole 12221. The protrusion 721 can be clamped with the fifth side wall 1005. In other embodiments, the second end 1222 is provided with a hook 1006 protruding inwardly along the first direction. The protrusion 721 can be locked with the hook 1006.

Referring to FIG. 15, the base portion 71 has a first terminal groove 711 recessed from the top wall of the base portion 71. The bottom wall of the first terminal groove 711 is concentric with a radius smaller than that of the first terminal groove 711, and continues to be recessed downwardly and extends through the base portion 71 to form a second terminal groove 712. An inner wall of the second terminal groove 712 is provided with a first protruding block 713.

Figure 16:
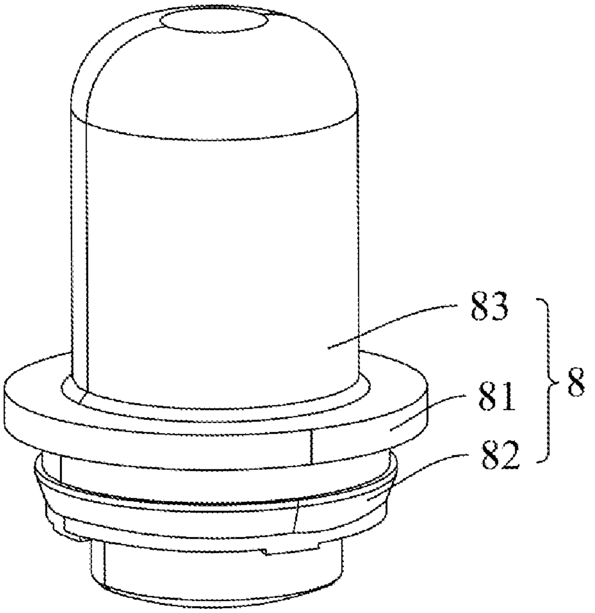
FIG. 16 is a perspective schematic view of a mating terminal of the cable connector assembly in accordance with an embodiment of the present disclosure.
Figure 18:
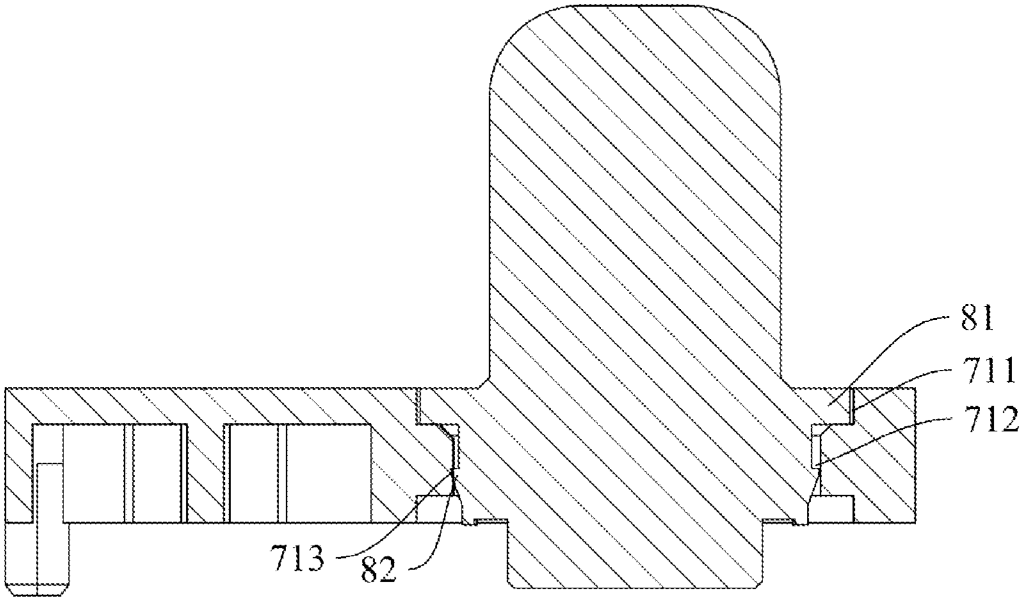
FIG. 18 is a schematic cross-sectional view taken along line D-D of FIG. 17.

Referring to FIGS. 16 and 18, the mating terminal 8 protrudes outwardly from its outer peripheral wall. The mating terminal 8 is provided with a first rib 81 and a second rib 82, respectively. The first rib 81 is received in the first terminal groove 711. The second rib 82 and the first protruding block 713 are interference fit.

The mating terminal 8 also has a contact portion 83. When the cable connector 100 is mated with the mating connector 200, the contact portion 83 is inserted into the inner cavity of the metal connecting member 2 from the bottom of the body portion 11 and the metal connecting member 2. The contact portion 83 is in contact with the conductive terminal 3 to realize data transmission. An upper surface of the first rib 81 abuts against a lower surface of the bottom wall 112, which further limits the first rib 81 in the butting direction. As a result, the contact portion 83 can be placed in the inner cavity of the metal connecting member 2 more stably, which makes the signal transmission more stable.

Figure 17:
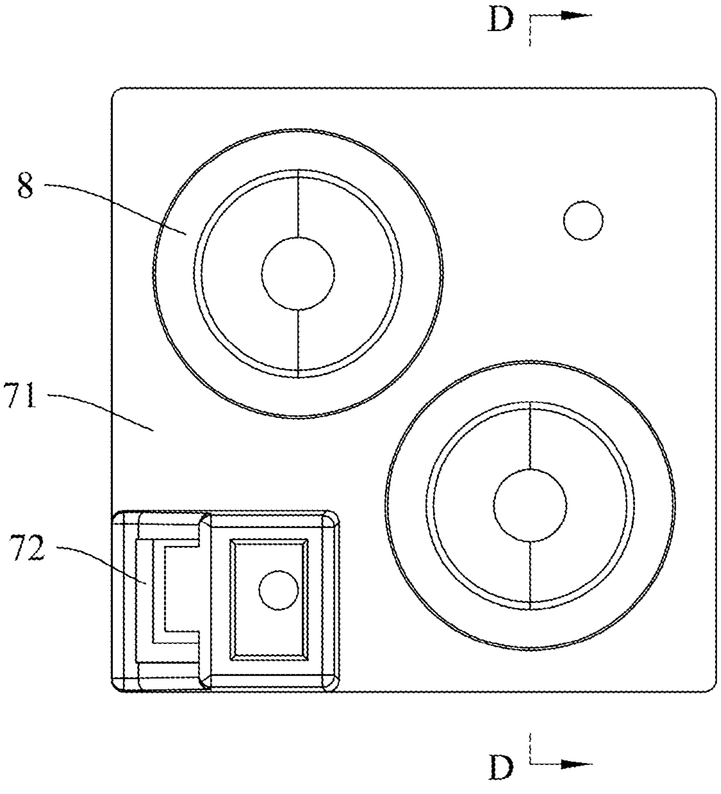
FIG. 17 is a schematic top view of an insulating body in FIG. 15.

Referring to FIG. 17, the holding portion 72 is located at a corner of the base portion 71. The mating terminals 8 are arranged asymmetrically in a length direction or a width direction of the base portion 71, so that the cable connector assembly has a more compact structure.

Figure 19:
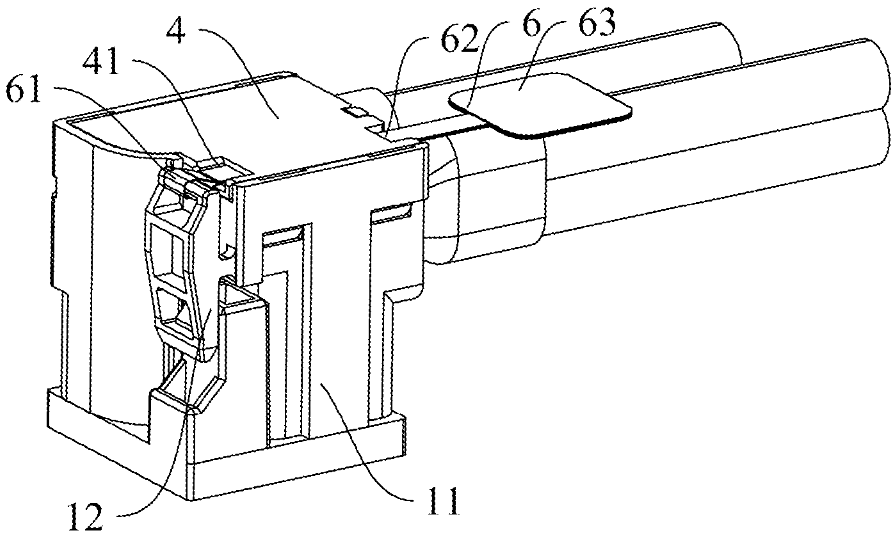
FIG. 19 is a perspective schematic view of the cable connector assembly in accordance with a second embodiment of the present disclosure.
Figure 20:
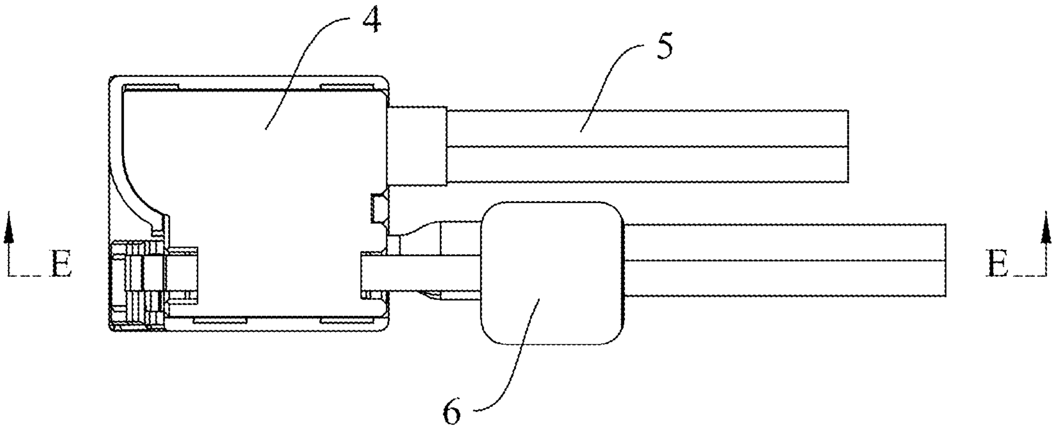
FIG. 20 is a schematic top view of FIG. 19.
Figure 21:
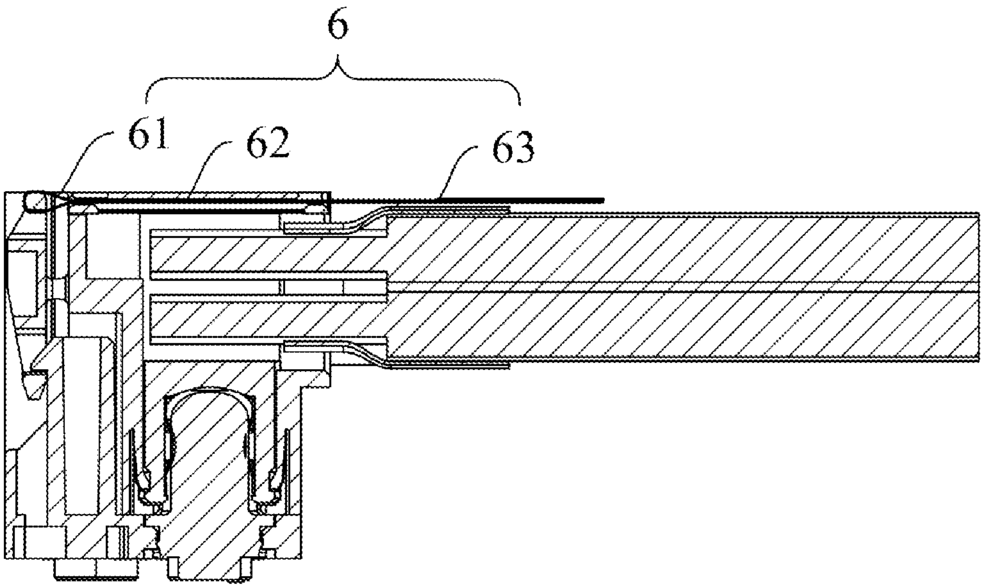
FIG. 21 is a schematic cross-sectional view taken along line E-E in FIG. 20.

A second embodiment shown in FIGS. 19 to 21 is a modification of the first embodiment. Except for the parts specifically described below, the structures of other parts can be the same as or similar to those in the first embodiment, and will not be repeated here.

In the second embodiment, the top surface of the upper cover 4 is provided with a second slot 41. In detail, the second slot 41 is located on the base plate portion 401 of the upper cover 4. After the connecting portion 62 of the pull strap 6 passes through the second slot 41, the first operating portion 63 is exposed on the top surface of the upper cover 4. This arrangement extends the length of the connecting portion 62 of the pull strap 6 and further restricts the position of the pull strap 6. An operator can pinch the pull strap 6 to unlock it under different mechanism scenarios. Optionally, according to the thickness of the upper cover 4, the height of the locking portion 12, or the requirements of the operating space, the second slot 41 can be located on a side or a top of the base plate portion 401; or a part of the second slots 41 is located on the side, and another part of the second slots is on the top.

Figure 22:
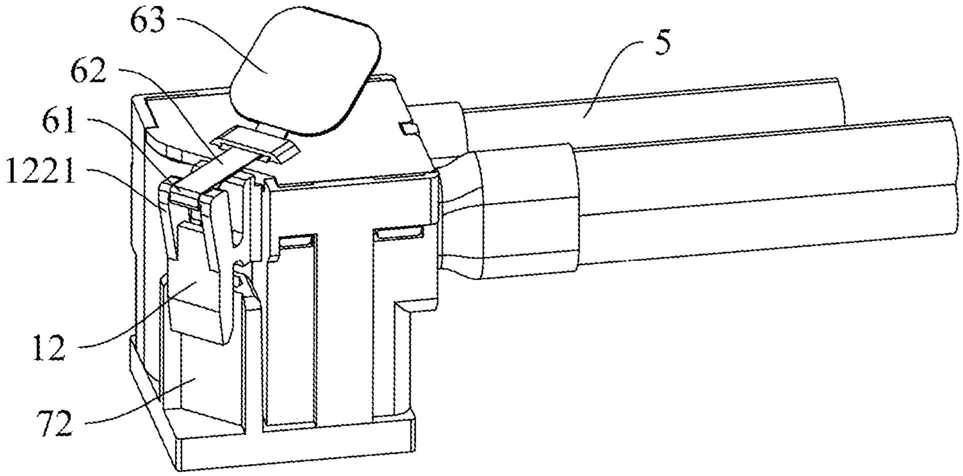
FIG. 22 is a perspective schematic view of the cable connector assembly in accordance with a third embodiment of the present disclosure.
Figure 23:
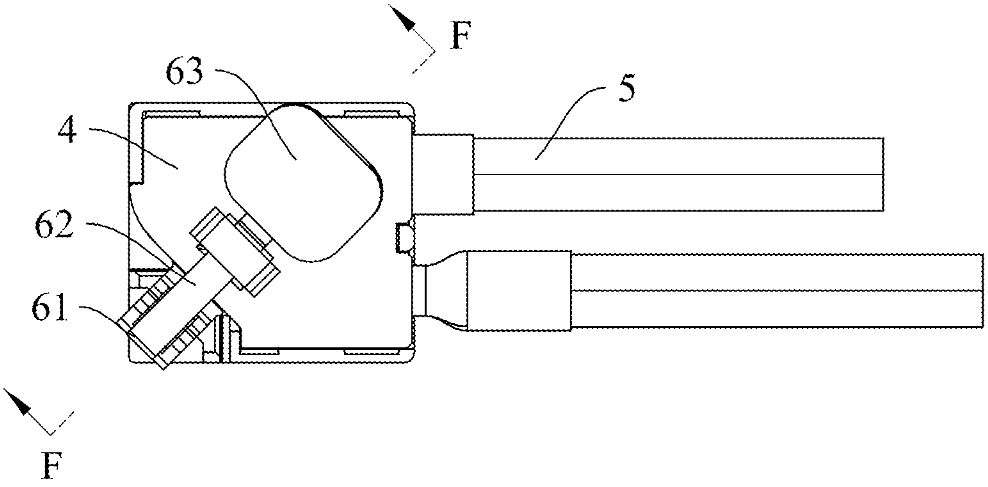
FIG. 23 is a schematic top view of FIG. 22.
Figure 24:
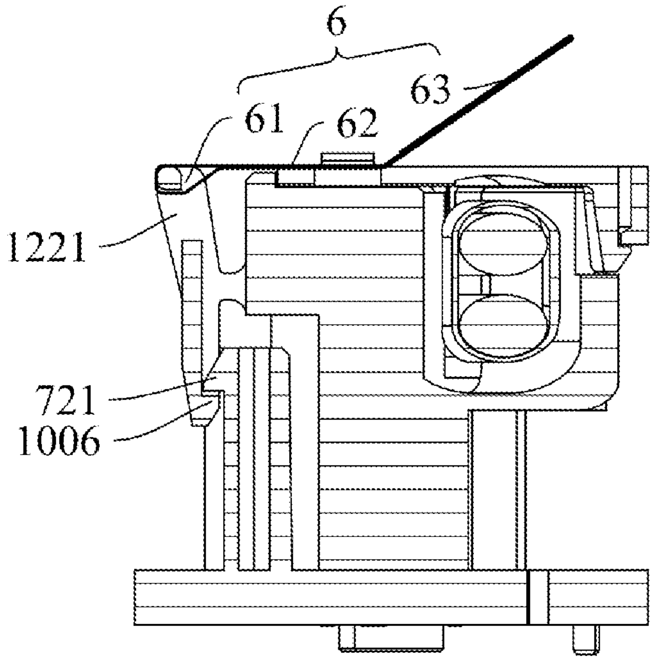
FIG. 24 is a schematic cross-sectional view taken along line F-F of FIG. 23.
Figure 25:
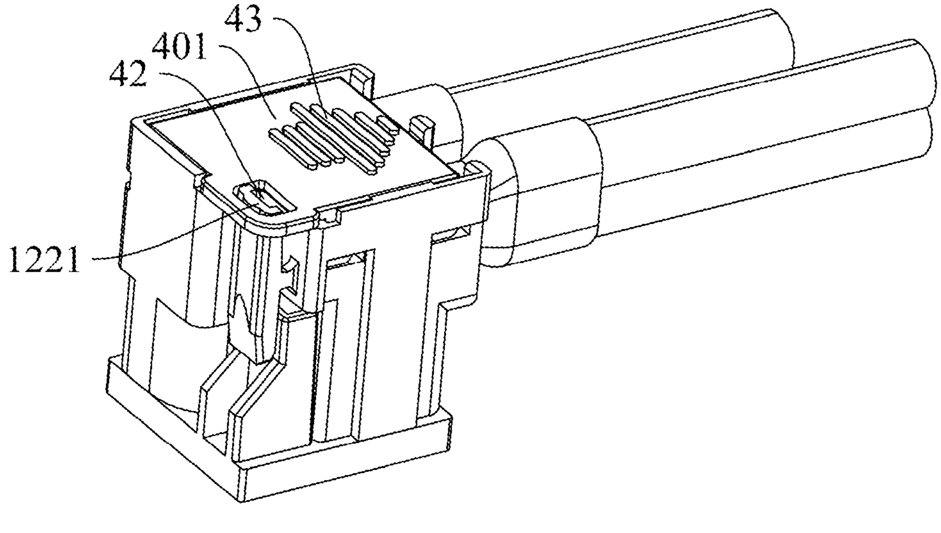
FIG. 25 is a perspective schematic view of the cable connector assembly in accordance with a fourth embodiment of the present disclosure.
Figure 26:
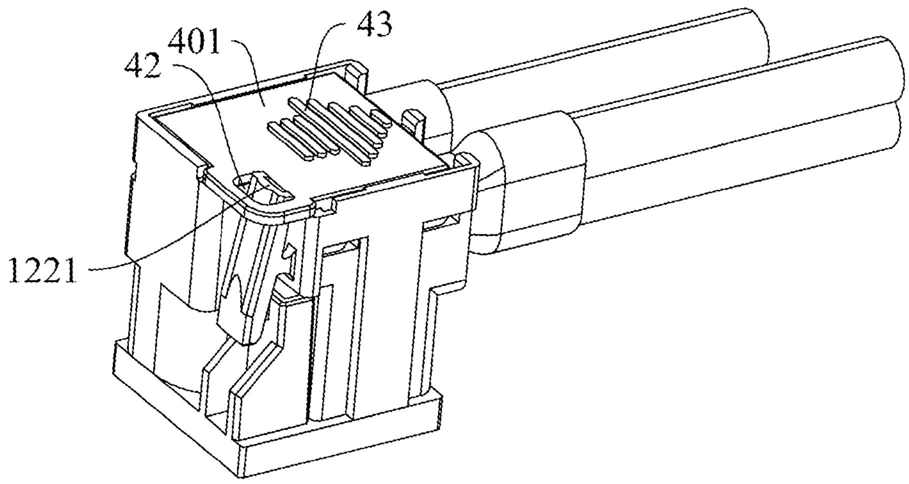
FIG. 26 is a perspective schematic view of the cable connector assembly in accordance with the fourth embodiment of the present disclosure when the upper cover is slid.
Figure 27:
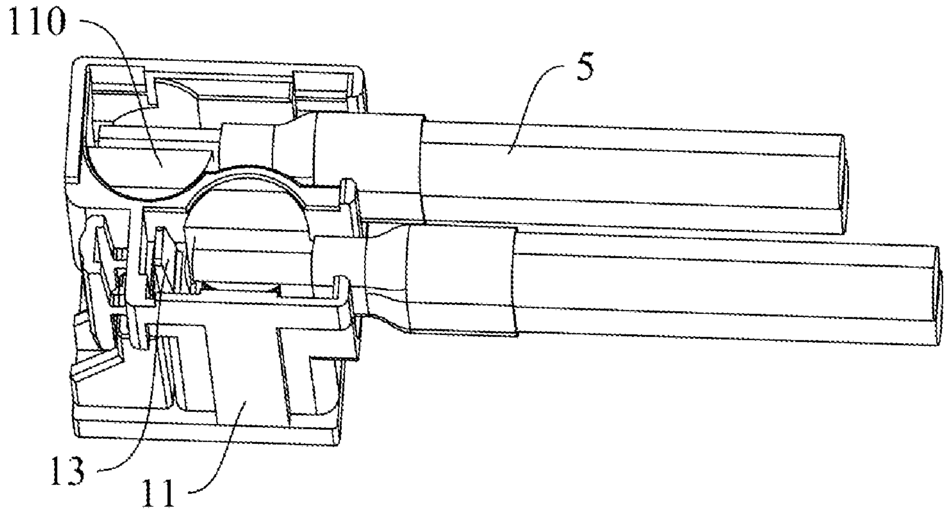
FIG. 27 is a perspective schematic view of the cable connector assembly in accordance with the fourth embodiment of the present disclosure when the upper cover is removed.
Figure 28:
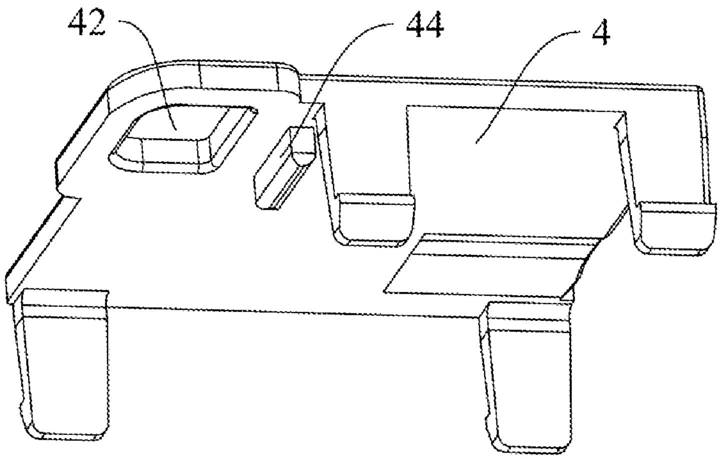
FIG. 28 is a perspective schematic view of the upper cover in accordance with the fourth embodiment of the present disclosure.
Figure 29:
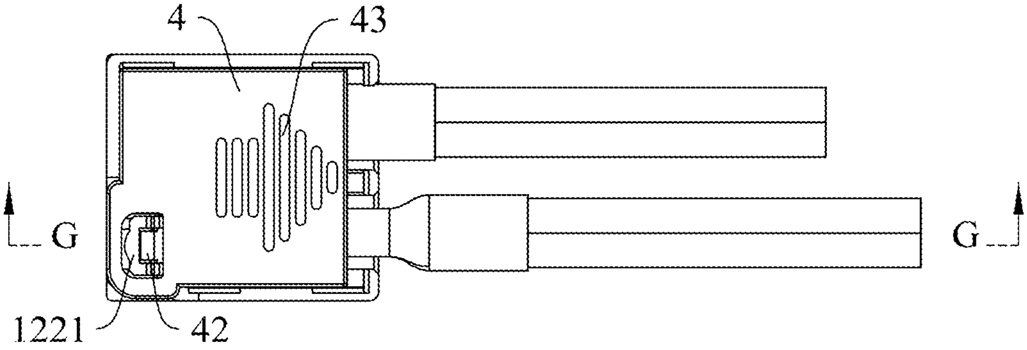
FIG. 29 is a schematic top view of FIG. 25.
Figure 30:
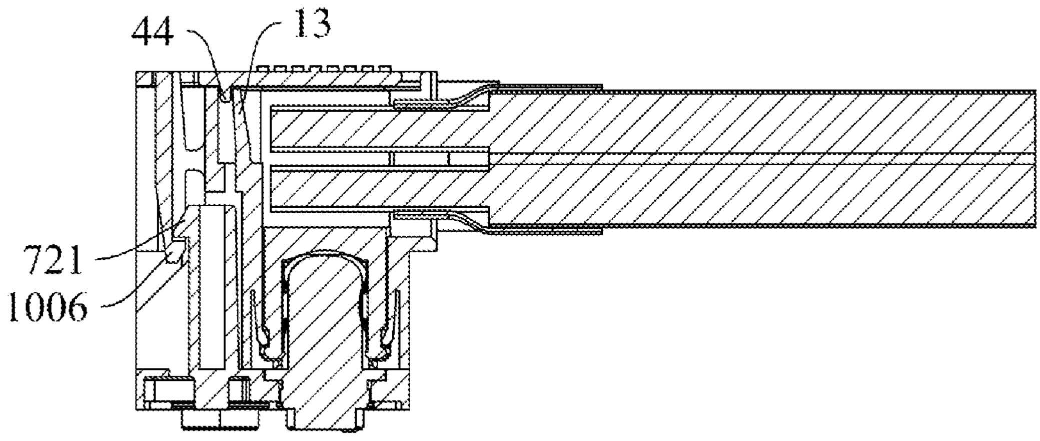
FIG. 30 is a schematic cross-sectional view taken along line G-G in FIG. 29.

A third embodiment shown in FIGS. 22 to 24 is a modification of the second embodiment. Except for the parts specifically described below, the structures of other parts can be the same as or similar to those in the second embodiment above, and will not be repeated here.

In the third embodiment, the pull strap 6, the locking portion 12 cooperating with the pull strap 6, and the holding portion 72 cooperating with the locking portion 12 are all rotated by a certain angle compared to those in the second embodiment. This makes an extension direction of the connecting portion 62 and an extension direction of the cable 5 oblique at 45°.

This setting makes it easy for the operator to unlock when the operating space is limited. In other embodiments, the angle between the extension direction of the connecting portion 62 and the extension direction of the cable 4 may also be other angles, which is not limited here.

The working principles of the first embodiment to the third embodiment are basically the same: in an initial position, the cable connector 100 is mated with the mating connector 200. When the operator pulls the pull strap 6 diagonally upwards or backwards or backwards by 45°, the fixing portion 61 drives the first side wall 1001 located therein to move close to the body portion 11 along a direction (that is, the first direction), and move the fifth side wall 1005 or the hook 1006 in a direction (that is, the second direction) away from the body portion 11. As a result, the fifth side wall 1005 or the hook 1006 is separated from the protrusion 721, and the unlocking is completed.

A fourth embodiment is a modification of the first embodiment. Referring to FIGS. 25 to 30, the unlocking mechanism is no longer the pull strap 6 as in the first embodiment, but the upper cover 4 with a changed structure. The upper cover 4 has an opening 42 recessed from the bottom wall of the base plate portion 401 toward the top wall thereof. The opening 42 receives the first end 1221. A plurality of protruding ribs are provided protruding upwardly from the top wall of the upper cover 4. The protruding ribs are convenient for an operator to slide the second operating portion 43 of the upper cover 4. In other embodiments, the opening 42 can also be a groove. The second operating portion 43 may also be a concave block recessed downwardly from the top wall of the upper cover 4. In the illustrated embodiment, the upper cover 4 in the fourth embodiment further includes a second protruding block 44 protruding downwardly from the bottom wall of the base plate portion 401. The body portion 11 is provided with an elastic beam 13 abutting against the second protruding block 44.

The working principle of the fourth embodiment is that when the operator slides the upper cover 4 in the first direction, the first end 1221 is driven by the opening 42 to move along a direction (that is, the first direction) close to the body portion 11; and the second end 1222 is driven to move away from the body portion 11 along another direction (that is, the second direction), thereby completing the unlocking. At this time, the top of the elastic beam 13 is bent in the first direction under the pulling force of the upper cover 4. When the operator loosens the upper cover 4, the elastic beam 13 can push the upper cover 4 to reset.

In summary, the present disclosure facilitates the unlocking between the cable connector and the mating connector by providing the unlocking mechanism which cooperates with the insulating housing 1. During the unlocking process, the operator operates the pull strap 6 or the upper cover 4 above the cable connector 100, without being too limited by space.

The above embodiments are only used to illustrate the present disclosure and not to limit the technical solutions described in the present disclosure. The understanding of this specification should be based on those skilled in the art. Descriptions of directions, although they have been described in detail in the above-mentioned embodiments of the present disclosure, those skilled in the art should understand that modifications or equivalent substitutions can still be made to the application, and all technical solutions and improvements that do not depart from the spirit and scope of the application should be covered by the claims of the application.

What is claimed is:

1. A cable connector, comprising:

an insulating housing comprising a body portion and a locking portion located on one side of the body portion, the locking portion comprising a pivot portion connected with the body portion and a locking plate connected with the pivot portion, the locking plate extending along a mating direction, the locking plate being provided with a middle section connected with the pivot portion, and a first end and a second end respectively extending in opposite directions from two ends of the middle section, the body portion defining a receiving cavity extending through the body portion along the mating direction, a bottom of the body portion being a mating end, and a top of the body portion being a cable connection end;

a metal connecting member received in the receiving cavity, the metal connecting member comprising an inner cavity recessed inwardly from a bottom wall of the metal connecting member;

a conductive terminal installed in the inner cavity of the metal connecting member;

a cable connected to the metal connecting member which is located on the top of the body portion; and an unlocking mechanism cooperating with the first end, the unlocking mechanism being configured to drive the first end to move in a first direction adjacent to the body portion, and to drive the second end to move in a second direction away from the body portion.

2. The cable connector according to claim 1, wherein the unlocking mechanism is a pull strap, the first end is provided with a first through hole and a first side wall located above the first through hole, the first through hole is located between the first side wall and the middle section in the mating direction, and the pull strap comprises a fixing portion passing through the first through hole and covering an outer periphery of the first side wall.

3. The cable connector according to claim 2, wherein a top wall of the body portion defines a first slot, the pull strap comprises a first operating portion and a connecting portion connected between the fixing portion and the first operating portion; and wherein after the connecting portion passes through the first slot, the first operating portion is exposed on the top wall of the body portion.

4. The cable connector according to claim 2, further comprising an upper cover which is fixed and covered on the top of the body portion.

5. The cable connector according to claim 4, wherein a top surface of the upper cover defines a second slot, the pull strap comprises a first operating portion and a connecting portion connected between the fixing portion and the first operating portion; and wherein after the connecting portion passes through the second slot, the first operating portion is exposed on the top surface of the upper cover.

6. The cable connector according to claim 1, wherein the unlocking mechanism comprises an upper cover covering the top of the body portion, the upper cover defines an opening to receive the first end, a top wall of the upper cover is provided with a protruding rib which is adapted to facilitate sliding of a second operating portion of the upper cover.

7. The cable connector according to claim 6, wherein the body portion is provided with an elastic beam which pushes the upper cover to reset.

8. A cable connector assembly, comprising:

a cable connector as claimed in claim 1; and a mating connector comprising an insulating body and a mating terminal, the insulating body comprising a base portion for holding the mating terminal and a holding portion extending from the base portion in the mating direction;

wherein the holding portion is provided with a protrusion protruding outwardly along the second direction, and the protrusion is mated with the second end.

9. The cable connector assembly according to claim 8, wherein the second end is provided with a second through hole and a side wall located below the second through hole, and the protrusion is capable of being clamped with the side wall.

10. The cable connector assembly according to claim 8, wherein the second end is provided with a hook protruding inwardly along the first direction, and the protrusion is capable of being clamped with the hook.

11. The cable connector assembly according to claim 8, wherein the mating connector comprises a plurality of the mating terminals that are arranged asymmetrically in a length direction or a width direction of the base portion.

12. A cable connector assembly, comprising:

a cable connector, comprising:

an insulating housing comprising a body portion and a locking portion located on one side of the body portion, the locking portion comprising a pivot portion connected with the body portion and a locking plate connected with the pivot portion, the locking plate extending along a mating direction, the locking plate being provided with a middle section connected with the pivot portion, and a first end and a second end respectively extending in opposite directions from two ends of the middle section, the body portion defining a receiving cavity along the mating direction;

a metal connecting member received in the receiving cavity, the metal connecting member defining an inner cavity;

a conductive terminal fixed in the inner cavity of the metal connecting member;

a cable electrically connected to the metal connecting member; and an unlocking mechanism cooperating with the first end, the unlocking mechanism being configured to drive the first end to move in a first direction towards the body portion, and to drive the second end to move in a second direction away from the body portion, simultaneously; and a mating connector comprising an insulating body and a mating terminal, the insulating body comprising a base portion for fixing the mating terminal and a holding portion, the holding portion being provided with a protrusion;

when the cable connector and the mating connector are mated with each other, the second end of the unlocking mechanism is in lock with the protrusion along the mating direction; and when the cable connector and the mating connector are required to be separated from each other, the second end of the unlocking mechanism is driven by an external force to move in the second direction away from the body portion so as to disengage with the protrusion along the mating direction.

13. The cable connector assembly according to claim 12, wherein the unlocking mechanism is a pull strap, the first end is provided with a first through hole and a first side wall located above the first through hole, the first through hole is located between the first side wall and the middle section in the mating direction, and the pull strap comprises a fixing portion passing through the first through hole to be connected to the first side wall.

14. The cable connector assembly according to claim 13, wherein a top wall of the body portion defines a first slot, the pull strap comprises a first operating portion and a connecting portion connected between the fixing portion and the first operating portion; and wherein after the connecting portion passes through the first slot, the first operating portion is exposed on the top wall of the body portion.

15. The cable connector assembly according to claim 13, wherein the cable connector further comprises an upper cover which is fixed and covered on a top of the body portion.

16. The cable connector assembly according to claim 15, wherein a top surface of the upper cover defines a second slot, the pull strap comprises a first operating portion and a connecting portion connected between the fixing portion and the first operating portion; and wherein after the connecting portion passes through the second slot, the first operating portion is exposed on the top surface of the upper cover.

17. The cable connector assembly according to claim 12, wherein the unlocking mechanism comprises an upper cover covering a top of the body portion, the upper cover defines an opening to receive the first end, a top wall of the upper cover is provided with a protruding rib which is adapted to facilitate sliding of a second operating portion of the upper cover.

18. The cable connector assembly according to claim 17, wherein the body portion is provided with an elastic beam which pushes the upper cover to reset.

19. The cable connector assembly according to claim 12, wherein the second end is provided with a second through hole and a side wall located below the second through hole, and the protrusion is capable of being clamped with the side wall.

20. The cable connector assembly according to claim 12, wherein the second end is provided with a hook protruding inwardly along the first direction, and the protrusion is capable of being clamped with the hook.

* * * * *